(12) United States Patent
Zhao et al.

(10) Patent No.: US 11,009,761 B2
(45) Date of Patent: May 18, 2021

(54) GRAYSCALE COLOR ELECTRONIC PAPER

(71) Applicant: DALIAN DKE LCD CO., LTD., Liaoning (CN)

(72) Inventors: Jinggang Zhao, Liaoning (CN); Lina Zhang, Liaoning (CN); Zhiling He, Liaoning (CN)

(73) Assignee: DALIAN DKE LCD CO., LTD., Liaoning (CN)

( * ) Notice: Subject to any disclaimer, the term of this patent is extended or adjusted under 35 U.S.C. 154(b) by 141 days.

(21) Appl. No.: 16/325,008

(22) PCT Filed: Dec. 8, 2016

(86) PCT No.: PCT/CN2016/108989
§ 371 (c)(1),
(2) Date: Feb. 12, 2019

(87) PCT Pub. No.: WO2018/032663
PCT Pub. Date: Feb. 22, 2018

(65) Prior Publication Data
US 2019/0171082 A1    Jun. 6, 2019

(30) Foreign Application Priority Data

Aug. 15, 2016  (CN) .......................... 201610668228.7
Aug. 15, 2016  (CN) .......................... 201620882825.5

(51) Int. Cl.
*G02F 1/167*  (2019.01)
*G02F 1/133*  (2006.01)
(Continued)

(52) U.S. Cl.
CPC .............. *G02F 1/167* (2013.01); *G02F 1/133* (2013.01); *G02F 1/1677* (2019.01); *G09G 3/34* (2013.01);
(Continued)

(58) Field of Classification Search
None
See application file for complete search history.

(56) References Cited

U.S. PATENT DOCUMENTS

2008/0100906 A1*  5/2008  Iftime ..................... G02F 1/167
                                                                 359/296
2009/0231526 A1*  9/2009  Yoshihara ........... G02F 1/13394
                                                                 349/115
2011/0285756 A1   11/2011 Sato

FOREIGN PATENT DOCUMENTS

CN          102193224 A          9/2011
CN          102591087 A          7/2012
(Continued)

*Primary Examiner* — Robert E. Tallman
(74) *Attorney, Agent, or Firm* — Novick, Kim & Lee, PLLC; Allen Xue

(57) ABSTRACT

A grayscale color electronic paper have a plurality of pixel structural units, each of them has a base color layer and a grayscale adjusting layer. The base color layer is able to display two or more colors. Colors displayed by the grayscale adjusting layer corresponds one-to-one to the colors displayed by the base color layer. The base color layer and the grayscale adjusting layer have respective driving structures. The base color layer can display colors such as black, white, red, green, blue, cyan, magenta and yellow; and the grayscale adjusting layer has multi-level grayscales, and each level of the gray scale has a steady state at a zero electric field.

10 Claims, 2 Drawing Sheets

(51) Int. Cl.
*G09G 3/34* (2006.01)
*G02F 1/1677* (2019.01)

(52) U.S. Cl.
CPC ...... *G02F 2201/44* (2013.01); *G02F 2203/30* (2013.01)

(56) References Cited

FOREIGN PATENT DOCUMENTS

| CN | 103676396 A | 3/2014 |
| CN | 205080346 U | 3/2016 |
| CN | 106054426 A | 10/2016 |

* cited by examiner

GRAYSCALE COLOR ELECTRONIC PAPER

TECHNICAL FIELD

The present disclosure belongs to the field of electronic paper, and particularly to a grayscale color electronic paper.

BACKGROUND ART

There are many technical solutions for a color electronic paper, according to the material type, the color mode can be divided into cholesteric liquid crystal, optical filter type, color particle type and electrowetting type; and according to the structure, the color mode can be divided into surface color mixing, three-layer superimposed color mixing and three-dimensional color mixing, etc. The main problems of the color electronic paper are narrow color gamut, low level of the grayscale and high cost. Regarding to the existing color mode technology solution, the particle type and the cholesteric liquid crystal are relatively mature, but the above three problems still cannot be solved at the same time. The deficiency of displaying the grayscale by the particle type is poor repeatability, especially in a single pixel, the types of color particle are increased, and the motion form is sensitive to temperature and waveform change under the action of an electric field. The main problems of three-layer superposition of the cholesteric liquid crystal are high cost and low reflectivity of black and white. The cost of the three-dimensional color mixing is relatively low, but the actual application requirement is still high, thereby limiting the application thereof in low-cost field. In order to obtain a wider range of applications, it is necessary to invent a new color electronic paper mode that comprehensively solves the problems of color gamut, grayscale and cost.

SUMMARY OF THE INVENTION

According to the technical problems put forward above, the present disclosure provides a grayscale color electronic paper. The present disclosure mainly uses a two-layer structure to realize the display performance of a high-level grayscale and a wide color gamut. Compared with the prior art, this electronic paper can realize the display of the high-level grayscale, has a wider chromatography range, balances the degree of difficulty in manufacturing a driving source device and a display structure, and has the advantage of low cost. The wide color gamut and grayscale can meet the high-standard display requirements of newspaper and magazine on color reappear.

The technical means used in the present disclosure are as follows.

The present disclosure provides a grayscale color electronic paper, wherein each pixel structural unit comprises a base color layer and a grayscale adjusting layer, the base color layer be able to display two or more colors, the colors displayed by the grayscale adjusting layer corresponds one-to-one to the colors displayed by the base color layer, and the base color layer and the grayscale adjusting layer have respective driving structures.

The base color layer can display colors such as black, white, red, green, blue, cyan, magenta and yellow, and the base color layer can at least display two colors, such as white or red, black or green, red or green, green or blue, white or cyan, or magenta or yellow and so on.

Further, each color displayed by the base color layer has a steady state at a zero electric field. The steady state at the zero electric field refers to when the electric field is zero, each color does not change during a certain time from several seconds to several years.

Further, the base color layer is a reflective structure. When black or white or some color is displayed, the color is formed through reflecting the light transmitted through the grayscale adjusting layer.

Further, the grayscale adjusting layer has multi-level grayscales, each level of the grayscales has a steady state at a zero electric field, and a color of grayscale level or a transparent color of grayscale level can be displayed. According to different display requirements, when the grayscale adjusting layer is designed to be transparent color having a grayscale level, multiple colors of grayscale can be displayed, and the chromatography is in accordance with the base color layer; and when the grayscale adjusting layer is designed to be colorful, hues more than the base color layer can be displayed, and meanwhile the level of the grayscale can be controlled by a driving voltage.

Further, the grayscale adjusting layer is a transmissive structure. The light is incident in the base color layer through the grayscale adjusting layer, and the base color layer screens and absorbs the spectral region of a non-display color. The reflected light of the base color layer reenters the grayscale adjusting layer, the intensity is changed again, and the required grayscale display is obtained finally.

Further, an outer edge of the base color layer is smaller than an outer edge of the grayscale adjusting layer. According to a size of the pixel, the width is generally 1 to 20 micrometers.

The above grayscale adjusting layer may be a cholesteric liquid crystal electronic control structure unit, or other transmissive electronic control structure unit, or an electronic control structure unit that absorbs primary color light.

The above base color layer may be an electrophoretic electronic paper, or other types of electronic control structure unit with a reflective function or absorbing primary color light, electronic paper in reflective mode that is transparent after powering up, such as electrowetting type, lateral electrophoresis technology, electrochromic type and so on.

Other non-cholesteric liquid crystal and non-electrophoretic electronic paper modes, such as smectic liquid crystal layer, electrochromic, electrowetting and other modes, are also applied to the present disclosure.

The grayscale adjusting layer of the present disclosure, in a color spectral region, the primary color light of the grayscale adjusting layer and the primary color light of the base color layer can display color images of wider color gamut.

The display principle of grayscale multi-color electronic paper is that: the base color layer is set to be white or red, and the grayscale adjusting layer is set to display the grayscale level transparent color or the grayscale level green. When white is displayed, the base color layer is displayed in white; the grayscale adjusting layer is the grayscale level transparent color; when red is displayed, the base color layer is displayed in red; the grayscale adjusting layer is the grayscale level transparent color; when yellow is displayed, the base color layer is displayed in red; the grayscale adjusting layer is the state of grayscale level green; adjusting the gray level of the grayscale level transparent color or the grayscale level green, so as to realize the grayscale display under multi-level steady state.

The display principle of full-color electronic paper is that: the base color layer is set to be white or black or red or green, and the grayscale adjusting layer is set to be able to display the grayscale level transparent color or the grayscale level blue. When white, black, red or green is displayed, the base color layer is correspondingly displayed in white, black, red and green; the grayscale adjusting layer shows different transparent states according to the grayscale requirements of various colors; when blue is displayed, the base color layer is correspondingly displayed in black or white, wherein black corresponds to dark blue, and white corresponds to light blue; according to the grayscale requirement of blue, the grayscale adjusting layer combines the base color layer to show different blue states; when other colors are displayed, the base color layer is white or black or red or green according to the color display requirement; and the grayscale adjusting layer shows different grayscale level transparent color or grayscale level blue according to the grayscale requirement of color. The grayscale color electronic paper realizes full-color display in a wide color gamut through an optimized combination of two layers.

The beneficial effects of the multi-level grayscale color electronic paper provided by the present disclosure are as follows.

Compared with the prior art, the grayscale color electronic paper provided by the present disclosure uses the two-layer structure to realize the display of high-level grayscale multi-color electronic paper or full-color electronic paper, and the level of the grayscale of display is widened by using the base color layer and the grayscale adjusting layer. The complexity of the electronic control component (such as the drive) and the box structure is balanced, the drive and the box structure are at an intermediate level compared with the prior art, thereby generally reducing the comprehensive cost of the color electronic paper.

The base color layer and the grayscale adjusting layer provided by the present disclosure can improve the level of the grayscale of the electronic paper while keeping the range of color gamut unchanged. Compared with the prior art, this structure has the characteristics of high-level grayscale and wide color gamut. The present disclosure provides a low-cost and effective structure support for the electronic paper to realize high-level grayscale and full-color display performance, which is expected to be more widely applied.

BRIEF DESCRIPTION OF THE DRAWINGS

In order to more clearly illustrate the technical solutions in the embodiments of the present disclosure or the prior art, the drawings to be used in the embodiments or the description of the prior art will be briefly described below. Obviously, the drawings in the following description are some embodiments of the present disclosure, and other drawings can be acquired according to these drawings for those skilled in the art without going through any creative work.

Figure 1:
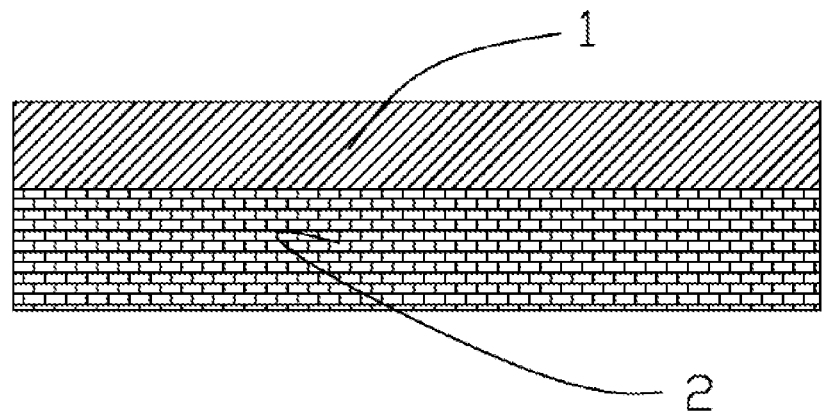
FIG. 1 illustrates a pixel structure diagram of grayscale color electronic paper according to the present disclosure.

In the drawings, 1—grayscale adjusting layer; 2—base color layer; 3—the first substrate; 4—the first electrode; 5—the first alignment layer; 6—cholesteric liquid crystal layer; 7—the second alignment layer; 8—the second electrode; 9—the second substrate; 10—the third electrode; 11—red electrophoretic particle; 12—green electrophoretic particle; 13—white electrophoretic particle; 14—black electrophoretic particle; 15—the fourth electrode; 16—the third substrate.

DETAILED DESCRIPTION OF THE PREFERRED EMBODIMENTS

In order to make the objects, the technical solutions and the advantages of the embodiments of the present disclosure more clearly, the technical solutions in the embodiments of the present disclosure are described hereinafter with reference to the drawings in the embodiments of the present disclosure. Obviously, the embodiments described are a part of the embodiments of the present disclosure instead of all of the embodiments. Based on the embodiments in the present disclosure, all other embodiments acquired by those skilled in the art without going through creative work shall fall within the protection scope of the present disclosure.

As shown in FIG. 1, a grayscale color electronic paper, each pixel structural unit comprises a base color layer 2 and a grayscale adjusting layer 1, the base color layer 2 can display two or more colors, the colors displayed by the grayscale adjusting layer 1 corresponding one-to-one to the colors displayed by the base color layer 2, and the base color layer 2 and the grayscale adjusting layer 1 have respective driving structures.

Each color displayed by the base color layer 2 has a steady state at a zero electric field.

The base color layer 2 is a reflective structure.

The grayscale adjusting layer 1 has multi-level grayscales, each level of the grayscales has a steady state at a zero electric field, and a color of grayscale level or a transparent color of grayscale level can be displayed.

The grayscale adjusting layer 1 is a transmissive structure.

An outer edge of the base color layer 2 is smaller than an outer edge of the grayscale adjusting layer 1.

Embodiment 1

In order to highlight the point of the present disclosure, this embodiment only provides the diagram of a single pixel structure unit instead of listing all components of the grayscale color electronic paper one by one, the electrophoretic liquid, the spacing material, the sealing portion, the leads electrode, the driving unit and other parts well known to those skilled in the art are omitted here, which does not affect the understanding to the present disclosure.

Figure 2:
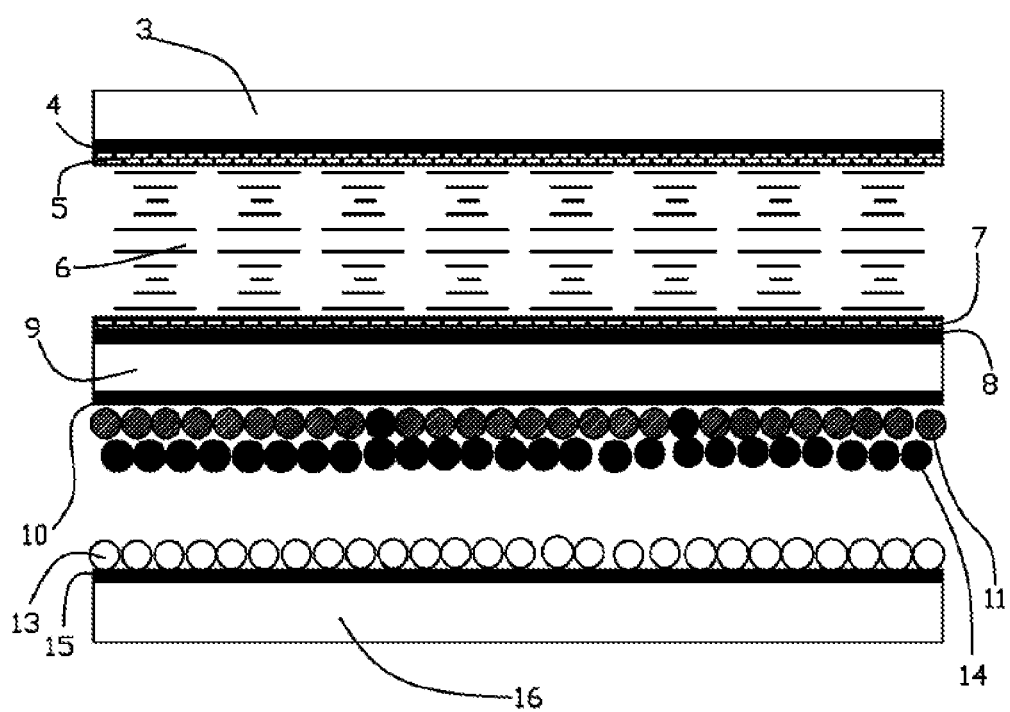
FIG. 2 illustrates a pixel structure diagram of grayscale multi-color electronic paper according to embodiment 1 of the present disclosure.

As shown in FIG. 2, the general structure of single pixel structure unit in the multi-color display grayscale electronic paper provided in this embodiment, from top to bottom orderly comprises: a first substrate 3, a first electrode 4, a first alignment layer 5, a cholesteric liquid crystal layer 6, a second alignment layer 7, a second electrode 8, a second substrate 9, a third electrode 10, red electrophoretic particles 11, black electrophoretic particles 14, white electrophoretic particles 13, a fourth electrode 15, and a third substrate 16, wherein the first substrate 3, the second substrate 9 and the third substrate 16 are all PET transparent substrate with a thickness of 100 micrometers; and the first electrode 4, the second electrode 8, the third electrode 10 and the fourth electrode 15 use ITO transparent electrode with a thickness of 2000 Angstroms. The liquid crystals of MDA-00-1444 and MDA-00-1445 of dual frequency system of MDA series are used in the cholesteric liquid crystal layer 6. The grayscale color electronic paper is formed by three-layer superimposed substrates, the electrophoretic liquid, electrophoretic particles and the cholesteric liquid crystal layer are respectively arranged between the superimposed substrates, the electrophoretic particles are distributed in transparent electrophoretic liquid (the electrophoretic particles described below or the function thereof refers to the electrophoretic particles distributed in the electrophoretic liquid), and are arranged between two electrodes (the third electrode 10 and the fourth electrode 15) adhered on the second substrate 9 and the third substrate 16, to form the base color layer 2. The cholesteric liquid crystal layer 6 is arranged between two alignment layers (the first alignment layer 5 and the second alignment layer 7) adhered on the first substrate 3 and the second substrate 9 to form the grayscale adjusting layer 1. That is, the grayscale adjusting layer 1 is formed by the first electrode 4, the first alignment layer 5, the cholesteric liquid crystal layer 6, the second alignment layer 7, and the second electrode 8. The base color layer 2 is formed by the third electrode 10, the fourth electrode 15, the red electrophoretic particles 11, the white electrophoretic particles 13, and the black electrophoretic particles 14.

The cholesteric liquid crystal layer 6 shown in FIG. 2 is in a plane state, the cholesteric liquid crystal layer 6 in this embodiment reflects green light under plane-state molecular arrangement structure, a ratio of the cholesteric liquid crystal is MDA-00-1444 (30%) and MDA-00-1445 (70%), and the orientation material is SE4811. The base color layer 2 shown in FIG. 2 is displayed in red, which is mixed into yellow with the green of the grayscale adjusting layer 1. Except for yellow, single color display (such as green, red, black and white) under different grayscale can be realized through applying electrical signals with different waveforms, and changing the grayscales and hues of the base color layer 2 and the grayscale adjusting layer 1.

Embodiment 2

Figure 3:
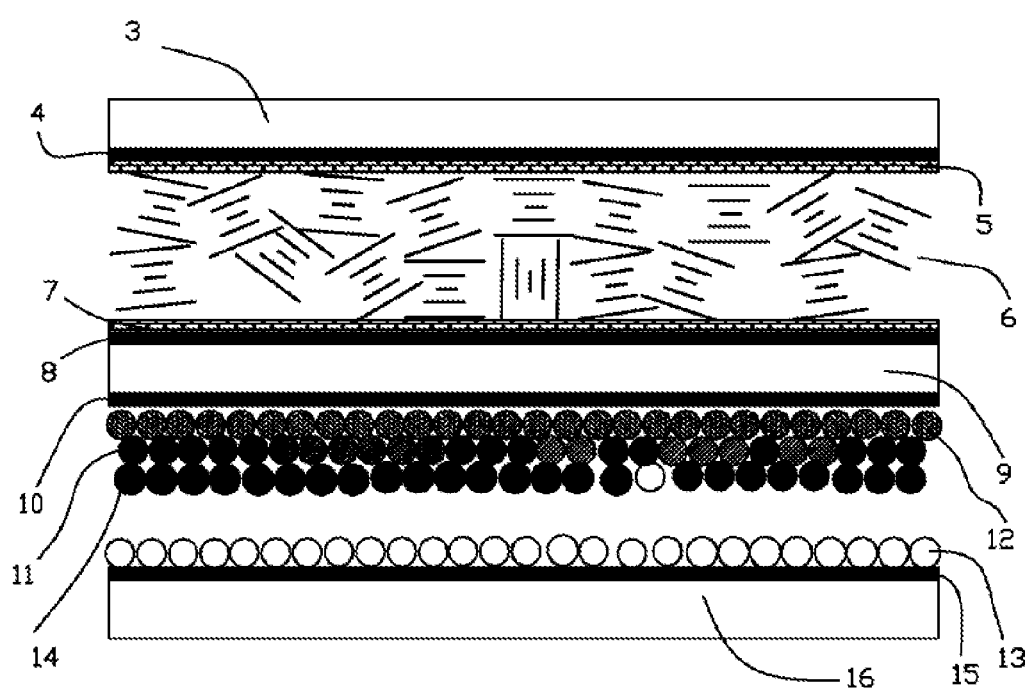
FIG. 3 illustrates a pixel structure diagram of full-color electronic paper according to a embodiment 2 of the present disclosure.

As shown in FIG. 3, the basic structure of single pixel structure unit in the full-color display electronic paper provided in this embodiment is the same as that in the embodiment 1, and the difference lies in that the base color layer 2 contains four electrophoretic particles of black, white, red and green (black electrophoretic particles 14, white electrophoretic particles 13, red electrophoretic particles 11 and green electrophoretic particles 12), which can realize the grayscale adjusting layer 1 displayed in blue. The cholesteric liquid crystal is MDA-00-1445, and the orientation material is SE4811. Under this condition, each pixel can be changed into different grayscales of black, white, red, green and blue. The base color layer 2 shown in FIG. 3 is green and the cholesteric liquid crystal layer 6 of the grayscale adjusting layer 1 is in a focal conic state, which is still displayed in green after color mixing with a change of the level of the grayscale only. The full-color display under different grayscales can be realized through applying electrical signals with different waveforms, and changing the grayscales and hues of the base color layer 2 and the grayscale adjusting layer 1. When a size of each pixel is reduced smaller than 0.1 mm×0.1 mm, the color mixing of adjacent pixels can be realized, and the full-color display of the higher level of the grayscale can be realized according to the color mixing rule.

Finally, it shall be noted that: the above embodiments are merely used for illustrating the technical solutions of the present disclosure instead of limiting; although the present disclosure has been described in detail with reference to the foregoing embodiments, those skilled in the art shall understand that: the technical solutions recorded in the foregoing embodiments may still be modified, or some or all of the technical features may be equivalently replaced; for example, only changing the color type or number of the base color layer and the grayscale adjusting layer, and increasing or decreasing the number of substrates, for example, four layers of substrates are used, which is also easily realized in the present disclosure. Other non-cholesteric liquid crystal and non-electrophoretic electronic paper modes, such as smectic liquid crystal layer, electrochromism, electrowetting and the like are also applied to the present disclosure. Any modifications, equivalent substitutions and improvements made within the modification and change scope of the present disclosure shall be included within the protection scope of the present disclosure.

The invention claimed is:

1. A grayscale color electronic paper, comprising:
a first substrate, a second substrate, and a third substrate, a base color layer disposed between the second substrate and the third substrate, and a grayscale adjusting layer disposed between the first substrate and the second substrate,
wherein the grayscale adjusting layer comprises a first electrode, a second electrode, a first alignment layer and a second alignment layer disposed between the first electrode and the second electrode, and a cholesteric liquid crystal layer disposed between the first alignment layer and the second alignment layer,
wherein the base color layer comprises a third electrode and a fourth electrode, an electrophoretic liquid disposed between the third electrode and the fourth electrode, and a plurality of electrophoretic particles dispersed in the electrophoretic liquid,
wherein the first electrode and the second electrode are connected to a first driving structure and the third electrode and the fourth electrode are connected to a second driving structure.

2. The grayscale color electronic paper according to claim 1, wherein a color displayed by the base color layer has a steady state at a zero electric field.

3. The grayscale color electronic paper according to claim 1, wherein the base color layer is a reflective structure.

4. The grayscale color electronic paper according to claim 1, wherein the grayscale adjusting layer has multi-level grayscales, each level of the grayscales has a steady state at a zero electric field.

5. The grayscale color electronic paper according to claim 1, wherein the grayscale adjusting layer is a transmissive structure.

6. The grayscale color electronic paper according to claim 1, wherein the base color layer is smaller than the grayscale adjusting layer.

7. The grayscale color electronic paper according to claim 2, wherein the base color layer is a reflective structure.

8. The grayscale color electronic paper according to claim 4, wherein the grayscale adjusting layer is a transmissive structure.

9. The grayscale color electronic paper according to claim 1, wherein the plurality of electrophoretic particles comprises red electrophoretic particles, black electrophoretic particles, and white electrophoretic particles.

10. The grayscale color electronic paper according to claim 9, wherein the plurality of electrophoretic particles further comprises green electrophoretic particles.

\* \* \* \* \*